(12) United States Patent
Guo et al.

(10) Patent No.: US 9,001,935 B2
(45) Date of Patent: Apr. 7, 2015

(54) METHOD AND ARRANGEMENT IN WIRELESS COMMUNICATIONS SYSTEM

(75) Inventors: Zhiheng Guo, Beijing (CN); Ruiqi Zhang, Beijing (CN); Hai Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 20 days.

(21) Appl. No.: 13/880,900

(22) PCT Filed: Oct. 25, 2010

(86) PCT No.: PCT/CN2010/001673
§ 371 (c)(1),
(2), (4) Date: Jul. 15, 2013

(87) PCT Pub. No.: WO2012/055065
PCT Pub. Date: May 3, 2012

(65) Prior Publication Data
US 2014/0211892 A1 Jul. 31, 2014

(51) Int. Cl.
*H04L 27/06* (2006.01)
*H04B 1/12* (2006.01)
(Continued)

(52) U.S. Cl.
CPC ............... *H04B 1/12* (2013.01); *H04L 5/0023* (2013.01); *H04L 25/0204* (2013.01); *H04L 25/0212* (2013.01); *H04L 25/022* (2013.01); *H04L 25/0232* (2013.01); *H04L 27/2647* (2013.01)

(58) Field of Classification Search
CPC .................... H04N 21/4382; H04N 21/44008; H04H 20/57; H04H 40/27; H04L 27/2657; H04L 27/2695; H04L 5/0007; H04L 25/0212; H04L 25/022; H04L 25/0202; H04L 25/0216; H04L 25/0222; H04L 25/0256

USPC .................................................. 375/260, 340
See application file for complete search history.

(56) References Cited

U.S. PATENT DOCUMENTS

| 6,771,591 B1 | 8/2004 | Belotserkovsky et al. |
| 7,068,593 B2 * | 6/2006 | Cho et al. ...................... 370/208 |

(Continued)

FOREIGN PATENT DOCUMENTS

| CN | 101228750 A | 7/2008 |
| EP | 1689140 A1 * | 8/2006 |
| WO | 2011100858 A1 | 8/2011 |

OTHER PUBLICATIONS

Jiao, M.W. et al. "An Improved OFDM Channel Estimation Algorithm Based on DFT." Communications Technology, vol. 43, No. 8, Aug. 31, 2010, pp. 117-120.

(Continued)

*Primary Examiner* — Don N Vo
(74) *Attorney, Agent, or Firm* — Murphy Bilak & Homiller, PLLC (57) ABSTRACT

The present invention relates to a receiving node, and to a related method of adjusting a frequency domain channel estimate in a receiving node of a wireless communication system using Orthogonal Frequency Division Multiplexing. The method comprises estimating (210) a phase rotation of the frequency domain channel estimate, and compensating (220) for the estimated phase rotation in the frequency domain channel estimate. It also comprises transforming (230) the compensated frequency domain channel estimate into a time domain channel estimate, filtering (240) the time domain channel estimate to suppress noise, transforming (250) the filtered time domain channel estimate back into a noise suppressed frequency domain channel estimate, and adding (260) the estimated phase rotation in the noise suppressed frequency domain channel estimate to achieve an adjusted and improved frequency domain channel estimate.

15 Claims, 6 Drawing Sheets

(51) Int. Cl.
*H04L 5/00* (2006.01)
*H04L 25/02* (2006.01)
*H04L 27/26* (2006.01)

(56) References Cited

U.S. PATENT DOCUMENTS

| | | | |
|---|---|---|---|
| 7,136,111 B2* | 11/2006 | Kim | 348/614 |
| 7,474,611 B2 | 1/2009 | Svensson et al. | |
| 7,672,221 B2* | 3/2010 | Fuji et al. | 370/210 |
| 7,714,937 B2* | 5/2010 | Kim et al. | 348/607 |
| 7,724,804 B2* | 5/2010 | Yamasuge | 375/136 |

| | | |
|---|---|---|
| 2007/0153926 A1 | 7/2007 | Arslan et al. |

OTHER PUBLICATIONS

Edfors, O. et al. "OFDM Channel Estimation by Singular Value Decomposition." IEEE Transactions on Communications, Jul. 1998, pp. 931-939, vol. 46, Issue No. 7.

Edfors, O. et al. "Analysis of DFT-based channel estimation for OFDM." Wireless Personal Communications, Jan. 2000, pp. 55-70, vol. 12, Issue No. 1, Kluwer Academic Publishers, The Netherlands.

Yang, B. et al. "Analysis of low-complexity windowed DFT-based MMSE channel estimator for OFDM systems." IEEE Transactions on Communications, Nov. 2001, pp. 1977-1987, vol. 49, Issue 11.

* cited by examiner

METHOD AND ARRANGEMENT IN WIRELESS COMMUNICATIONS SYSTEM

TECHNICAL FIELD

The present invention relates to frequency domain channel estimation. More particularly, the present invention relates to a receiving node and a method of adjusting a frequency domain channel estimate in a receiving node of a wireless communication system using Orthogonal Frequency Division Multiplexing.

BACKGROUND

Figure 1A:
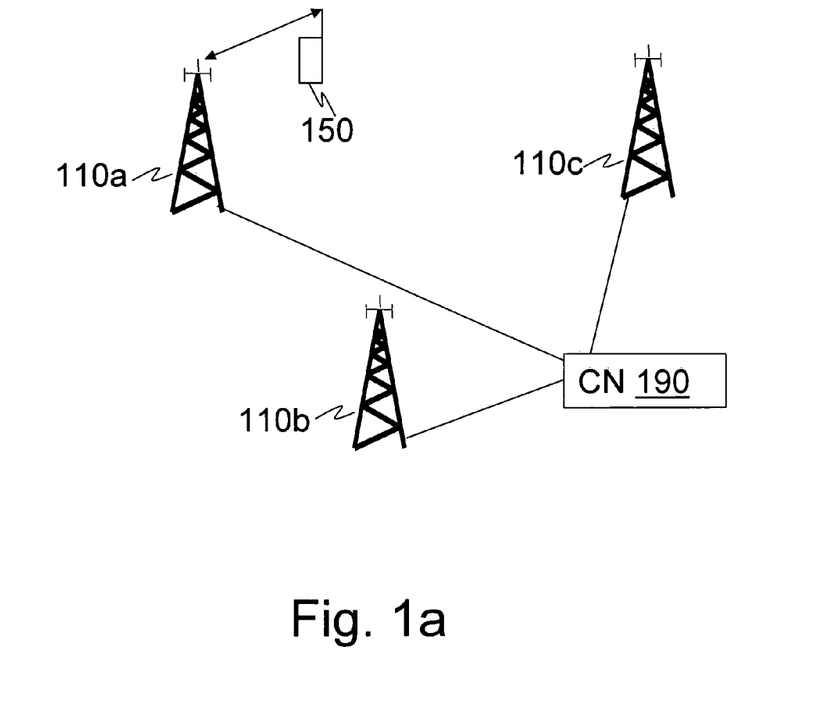
FIG. 1a illustrates schematically a conventional wireless communication system, wherein the present invention may be implemented.

The Universal Mobile Telecommunication System (UMTS) is one of the third generation mobile communication technologies designed to succeed the Global System for Mobile communication (GSM). 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS and Evolved UTRAN (E-UTRAN) is the radio access network of an LTE system. In an E-UTRAN, a user equipment (UE) 150 is wirelessly connected to a radio base station (RBS) 110a commonly referred to as an eNodeB or eNB (E-UTRAN NodeB), as illustrated in FIG. 1a. The eNBs 110a-c are directly connected to the core network (CN) 190.

In a wireless communication system using Orthogonal Frequency Division Multiplexing (OFDM) technology, the entire channel is divided into many narrow sub-channels, which are transmitted in parallel. This technique thus transforms a frequency selective wide-band channel into a group of non-selective narrowband channels, making it robust against large delay spread by preserving the orthogonality in the frequency domain. The primary advantage of OFDM over single-carrier schemes is its ability to cope with severe channel conditions without complex equalization filters in the receiver. Channel equalization is simplified because OFDM may be viewed as using many slowly-modulated narrowband signals rather than one rapidly-modulated wideband signal. The low symbol rate makes the use of a guard interval between symbols affordable, making it possible to handle time-spreading and eliminate inter-symbol interference.

In an LTE system the OFDM technology is adopted as a mean to achieve high transmission capability and robustness to multi-path delay. Orthogonal Frequency-Division Multiple Access (OFDMA) is used in the downlink, and Single-carrier frequency-division multiple access (SC-FDMA) is used in the uplink. OFDMA is a multi-user version of OFDM, where multiple access is achieved by assigning subsets of subcarriers to individual users. SC-FDMA is a linearly pre-coded OFDMA scheme. The distinguishing feature of SC-FDMA is that it leads to a single-carrier transmit signal, in contrast to OFDMA which is a multi-carrier transmission scheme.

Channel estimation has been widely used to improve the performance of OFDM systems, and is crucial for e.g. diversity combination, coherent detection, and space-time coding. Pilot based channel estimation schemes are commonly used. In such a scheme known reference symbols—also called pilot symbols—are inserted at regular intervals in the time-frequency grid. Using the knowledge of the pilot symbols, the receiver can estimate the frequency domain channel around the location of the pilot symbol. The channel's frequency response across the whole bandwidth can thus be determined by interpolation using various channel estimation schemes, such as Least Square (LS), Linear Minimum Mean Square Error (LMMSE), or Discrete Fourier Transform (DFT) based estimation. With the DFT based estimation, the frequency domain channel estimate is transformed into a time domain channel estimate, and the time domain properties of the channel are used instead of the frequency domain properties when estimating the channel.

In OFDM systems such as LTE, where OFDMA and SC-FDMA are used for downlink and uplink respectively, each user only accesses a part of the available frequency bandwidth. This means that channel estimates are only available for a part of the complete frequency bandwidth, and therefore the time domain channel estimate cannot be obtained from the conventional DFT based estimation scheme. The reason is that an inverse discrete Fourier transformation (IDFT) of a partial frequency response, leads to a channel impulse response where channel power leaks to all taps in the time domain due to sampling at non-integer tap positions. The unwanted noise and the useful channel power that has leaked out in the time domain will therefore be mixed up, and the conventional DFT based estimation scheme will not only eliminate the noise but will also eliminate some of the useful leakage power as they cannot be distinguished from each other.

SUMMARY

The object of the present invention is to address some of the problems and disadvantages outlined above, and to provide an improved channel estimate in a receiving node of a system using OFDM. This object and others are achieved by the method and node according to the independent claims, and by the embodiments according to the dependent claims.

In accordance with a first aspect of embodiments, a method of adjusting a frequency domain channel estimate in a receiving node of a wireless communication system using Orthogonal Frequency Division Multiplexing is provided. The method comprises estimating a phase rotation of the frequency domain channel estimate, and compensating for the estimated phase rotation in the frequency domain channel estimate. It also comprises transforming the compensated frequency domain channel estimate into a time domain channel estimate, and filtering the time domain channel estimate to suppress noise. Furthermore, the method comprises transforming the filtered time domain channel estimate into a noise suppressed frequency domain channel estimate, and adding the estimated phase rotation to the noise suppressed frequency domain channel estimate to achieve an adjusted frequency domain channel estimate.

In accordance with a second aspect of embodiments, a receiving node for a wireless communication system using Orthogonal Frequency Division Multiplexing is provided. The receiving node is configured to adjust a frequency domain channel estimate. It comprises an estimating unit adapted to estimate a phase rotation of the frequency domain channel estimate, a compensating unit adapted to compensate for the estimated phase rotation in the frequency domain channel estimate, and a first transforming unit adapted to transform the compensated frequency domain channel estimate into a time domain channel estimate. The node also comprises a filtering unit adapted to filter the time domain channel estimate to suppress noise, a second transforming unit adapted to transform the filtered time domain channel estimate into a noise suppressed frequency domain channel estimate, and an adding unit adapted to add the estimated phase rotation to the noise suppressed frequency domain channel estimate to achieve an adjusted frequency domain channel estimate.

An advantage of particular embodiments is that they improve the accuracy of traditional DFT based channel estimation, while keeping the computational complexity low.

DETAILED DESCRIPTION

In the following, the invention will be described in more detail with references to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. Particular embodiments of the invention are described in a non-limiting general context in relation to an LTE system. It should though be noted that the invention and its exemplary embodiments may also be applied to other types of radio access networks using OFDM.

In embodiments of the present invention, the problem of the channel power leakage after an IDFT of a partial frequency response is addressed by a solution where the phase rotation of the frequency domain channel is estimated and compensated for before the frequency domain channel estimate is transformed into a time domain channel estimate. The power leakage that occurs in the conventional channel estimation method is caused by a sampling at non-integer channel taps. As only a limited part of the spectrum is allocated to one user, the sampling frequency will be lower than it would have been for an allocation over the complete spectrum. The sampling position will thus not correspond to the actual channel taps, and this is referred to as sampling at non-integer channel taps or as sampling at improper positions. As a phase rotation in the frequency domain corresponds to a delay in the time domain, a compensation for the phase rotation in the frequency domain channel estimate will allow for a shift of the sampling position to integer channel taps. Such compensation will thus allow for a transformation of the frequency domain channel estimate into a time domain channel estimate with reduced channel power leakage. The noise in the time domain channel estimate may then be filtered out in a more accurate way. Finally, the filtered time domain channel estimate may be transformed into a noise suppressed frequency domain channel estimate, and the estimated phase rotation may be added to achieve an improved frequency domain channel estimate compared to what is possible with the traditional DFT based channel estimation.

This disclosure thus relates to a phase compensation based channel estimation scheme. Through estimation and compensation of the phase rotation, the problem caused by improper sampling positions is effectively handled and the leakage of channel power in the time domain is decreased. As a result the channel estimate accuracy is increased. The disclosed method works well in the case of a flat or near-to-flat channel with high signal to noise ratio (SNR). In such a channel the phase rotation is visible and it is thus possible to estimate the phase rotation with adequate accuracy.

In prior art, it has been disclosed to use a channel estimation with adaptive virtual over-sampling, which also deals with the problem caused by improper sampling position. A drawback of the virtual over-sampling method is the increased computational complexity especially when a large number of resource blocks is allocated, and when the over-sampling rate is high. The present invention addresses this drawback by providing a less complex solution to the same problem.

Most of the channel power is concentrated in the first few taps of the channel estimate—also called the channel impulse response—in the time domain due to the correlation between sub-carriers. However, if a small number of resource blocks are allocated to a user, the time resolution will be low in the channel impulse response and a tap will be spread in time and may overlap with other taps. Consequently all the channel taps may not be distinguished from each other. Furthermore, some of the channel power will leak to all taps in the time domain due to the improper sampling position, as already described above. It may thus be difficult to distinguish the channel power leakage from the noise if the sampling position is not optimal.

Since the improper sampling position in the time domain is related to the phase rotation between two adjacent sub-carriers in the frequency domain, the phase rotation can be estimated and compensated for in the frequency domain channel estimate before the channel estimate is transformed into the time domain. This will result in a better sampling position such that the channel power leakage is concentrated to as few channel taps as possible.

The method of adjusting a frequency domain channel estimate comprises a number of steps that will be described in the following. It is assumed that a channel estimation scheme such as a Least Square (LS), or a Linear Minimum Mean Square Error (LMMSE) channel estimation scheme provides the following frequency domain channel estimate:

$$H=[H_0, H_1, \ldots, H_{N-2}, H_{N-1}] \quad [1]$$

with N channel taps. In a first step, the phase rotation of this frequency domain channel estimate is estimated. In one embodiment, the phase $\theta_n$ of each frequency domain channel tap $H_n$ is first calculated, and the phase rotation $\phi$ may then be estimated based on these calculated phases. The phases of the frequency domain channel taps $H_n$ may be calculated according to the following:

$$[\theta_0 \, \theta_1 \ldots \theta_{N-1}]^T = \text{unwrap}(\text{angle}([H_0 \, H_1 \ldots H_{N-1}]^T)). \quad [2]$$

where the function angle(A) returns the phase angle in radians for each element in the vector A, and the function unwrap (A) changes absolute jumps between consecutive elements in the vector A which are greater than or equal to π to their 2π complement.

The phase rotation may be estimated based on these calculated phases using different methods.

According to a first embodiment of the invention, the phase rotation φ is estimated based on a mean value of phase differences between sub-carriers. The phases calculated as described above are indexed in the same order as the frequency domain channel taps, and are thus indexed with the index n=0, 1, ..., N−1. First, phase differences are calculated for all pairs of phases that have a defined index interval $M_{int}$, which is the difference between the indexes of the two phases in the pair. Next, the phase rotation is estimated as the mean value of all calculated phase differences divided by the defined index interval. The following equation may thus be used to estimate the phase rotation:

$$\phi = \frac{1}{M_{int}} \text{mean}\left(\sum_{n=0}^{N-1-M_{int}} (\theta_{n+M_{int}} - \theta_n)\right). \quad [3]$$

If $M_{int}$ is defined to be one, the phase rotation is estimated as the mean value of the phase differences between adjacent channel taps, as the difference between channel tap indexes is equal to one for adjacent channel taps. The advantage of this first embodiment is that it is a simple way of estimating the phase rotation.

According to a second embodiment, the phase rotation is estimated based on a polynomial approximation using the calculated phases of the channel taps as input. The phases of the frequency domain channel taps can be expressed as:

$$\begin{bmatrix} 0 & 1 \\ 1 & 1 \\ \vdots & 1 \\ N-1 & 1 \end{bmatrix} \times [\phi \quad \phi_{init}]^T = \begin{bmatrix} \theta_0 \\ \theta_1 \\ \vdots \\ \theta_{N-1} \end{bmatrix} \quad [4]$$

where $\phi_{init}$ is the initial phase which is the same for all sub-carriers, and φ is the phase rotation. The estimated phase rotation and initial phase may thus be estimated as:

$$[\phi \quad \phi_{init}] = \left(\begin{bmatrix} 0 & 1 \\ 1 & 1 \\ \vdots & 1 \\ N-1 & 1 \end{bmatrix}\right)^+ \times \begin{bmatrix} \theta_0 \\ \theta_1 \\ \vdots \\ \theta_{N-1} \end{bmatrix}, \quad [5]$$

where $(A)^+$ denote a pseudo-inverse of matrix A. The advantage of this second embodiment is that it provides a more accurate phase rotation estimate compared to the first embodiment.

It should be noted that the estimation according to any of the first and second embodiments above, results in one single value for the phase rotation φ. This value thus represents a consolidated estimated phase rotation for all channel taps. The estimate is thus best suited for a flat channel which provides one main high power tap.

In the next step of the method, a compensation for the estimated phase rotation φ is done in the frequency domain channel estimate, resulting in a compensated frequency domain channel estimate according to:

$$\hat{H} = [\hat{H}_0, \hat{H}_1, \ldots, \hat{H}_{N-2}, \hat{H}_{N-1}] \quad [6]$$

where $\hat{H}_n = H_n \times e^{-j\Phi n}$, n=0, 1, ..., N−1.

It should be noted that the estimated phase rotation is the total effect of delay of channel taps and of a sampling at non-integer channel taps. The delay of channel taps causes $$\left\lfloor \frac{\phi}{2\pi} N \right\rfloor \times \frac{2\pi}{N}$$

phase rotation, and the improper sampling position causes $$\phi - \left\lfloor \frac{\phi}{2\pi} N \right\rfloor \times \frac{2\pi}{N}$$

phase rotation, where $\lfloor \ \rfloor$ is the floor function. It is preferred to only compensate for the phase rotation caused by improper sampling position, as an estimation error in the phase rotation otherwise might cause a performance degradation. A compensation for an improper sampling position will only move the position of the channel taps in the time domain±half a sampling interval, while a compensation for the delay of channel taps may move the channel tap position up to a hundred sampling intervals. An unexpected error in the phase rotation estimate may thus make the channel tap positions change too much if a compensation for the channel tap delay is done.

In a subsequent method step, the phase rotation compensated frequency domain channel estimate is transformed into a time domain channel estimate, e.g. with an inverse fast Fourier transform (IFFT), thus resulting in the following time domain channel estimate:

$$h = [h_0, h_1, \ldots, h_{N-2}, h_{N-1}] \quad [7]$$

$$= IFFT[\hat{H}]$$

A fast Fourier transform (FFT) is an efficient algorithm to compute the discrete Fourier transforms (DFT) and correspondingly the inverse FFT (IFFT) is used to compute the inverse DFT.

After the phase compensation in the frequency domain, most of the channel power is concentrated to one interval of the time domain channel h due to the channel correlation between sub-carriers and thanks to the decreased channel power leakage. In order to reduce the noise, the resulting time domain channel estimate h is filtered in a subsequent step. In one embodiment of the invention, the filtering is performed as explained hereinafter.

First the peak power tap position of the time domain channel estimate h is determined. The peak power of h is found at the tap with index $n_{max}$, and is given by $|h_{n_{max}}|^2$. Preferably, the peak search is limited to the search intervals n=[0,L] and n=[N−L,N−1]. If assuming that the system delay is within the length of the cyclic prefix (CP), L is a channel length which may correspond to the length of the CP. The peak power tap should thus be found in these intervals. When the peak power tap position is determined, the peak region intervals are defined as the intervals within the channel length L from the determined peak power tap position $n_{max}$.

Secondly, a noise threshold is set to pick up the valid channel paths. All channel taps above the noise threshold and within the peak region intervals should be valid channel paths. The noise threshold is set as $T\epsilon$ where T is a constant and $\epsilon$ is the noise level determined as the mean power of the taps outside of the peak region intervals according to the following:

$$\varepsilon = \underset{L<mod(n-n_{max},N)<N-L}{\text{mean}}(|h_n|^2) \qquad [8]$$

T is a constant which can be obtained from simulations to achieve the best performance. As a typical example T=2, but generally T has a value in the interval [1.5, 2.5]. In prior art where the channel estimate has not been phase compensated and channel power therefore leaks to all taps in the time domain, $\epsilon$ comprises both the power of the noise and the leakage power. This will thus lead to a larger value of $\epsilon$ and to that more channel taps will be filtered out, and the estimated channel power will therefore be smaller than the real channel power.

If uplink MU-MIMO (multi-user multiple input multiple output) is enabled, then the positions used above when determining the noise level, that is all positions that are outside of the peak region intervals and that satisfy the condition $L<\text{mod}(n-n_{max},N)<N-L$ should be adjusted. Positions occupied by cyclic-shifted reference-signal sequences used for MU-MIMO should be removed.

Finally, when the noise threshold is set, taps are suppressed according to the following formula [9]:

$$h'_n = \begin{cases} h_{n_{max}}, & n = n_{max} \\ h_n, & |h_n|^2 \geq T\varepsilon \quad \begin{array}{l} 0 < \text{mod}(n-n_{max}, N) \leq L \text{ or} \\ N-L \leq \text{mod}(n-n_{max}, N) \leq N-1 \end{array} \\ 0 & \text{else} \end{cases}$$

This suppresses taps with a power that falls below the respective noise threshold $T\epsilon$ and are positioned within the channel length L from the determined peak power tap position $n_{max}$. Furthermore, all taps that are not positioned within the channel length L from the determined position $n_{max}$ are also suppressed. It should be noted that the channel is "cyclic" in time domain, and tap N−1 is therefore adjacent to tap 0. The tap at the peak power tap position is left unchanged, and the result of the filtering is that only sufficiently strong taps around the peak power tap survives.

In a next step of the method, the filtered time domain channel estimate h' is transformed back into a noise suppressed frequency domain channel estimate. In one embodiment this is done based on an N-point FFT:

$$H'=FFT[h']=[H_0', H_1', \ldots, H_{N-1}']. \qquad [10]$$

In the last step of the method, the phase rotation that was estimated and compensated for in the first steps described above, is now added to the noise suppressed frequency domain channel estimate in order to revert the compensation that was previously done.

The result is an adjusted frequency domain channel estimate according to:

$$H''=[H_0'', H_1'', \ldots, H_{N-1}''] \qquad [11]$$

where $H_n''=H_n' \times e^{j\phi n}$ for n=0, 1, . . . , N−1. This adjusted frequency domain channel estimate H" may now be used for data demodulation and other purposes requiring an accurate channel estimate.

To illustrate the performance of the adjusted frequency domain channel estimate, it is compared with a frequency domain channel estimate without phase compensation by means of simulations. The simulation parameters are given in Table 1. Eight allocated resource blocks (RB) corresponds to 96 sub-carriers, as there are 12 sub-carriers in each RB. As one SC-FDMA symbol corresponds to 2048/30.72=66.67 microseconds, the resolution for a channel estimate in the time domain is thus T=66.67/96=0.6944 microseconds for this simulated case. This means that the time domain model is sampled at time positions {1*T, 2*T, 3*T, . . . , 96*T} i.e. {0.6944, 1.3889, 3.0833, . . . , 66.67}. If the first path delay of the channel is set to 1.04 μs, this means that the channel tap is placed exactly between two samples, i.e. 1.5*T=1.04 microseconds.

TABLE 1

| Simulation parameter configuration | |
|---|---|
| Simulation parameter | Value |
| Standard | 3GPP LTE Release 8 |
| Physical channel | Physical Uplink Shared Channel (PUSCH) |
| System bandwidth | 20 MHz |
| Doppler frequency | 5 Hz |
| Number of sub-carriers per RB | 12 |
| Number of RBs allocated to the user | 8 |
| Channel coding & modulation | ⅔ turbo coding, 16 Quadrature Amplitude Modulation (QAM) |
| Number of antennas at the eNodeB | 2 |
| Channel Model | 3GPP Extended Pedestrian A (EPA) |
| First path delay of channel | 1.04 μs |

Figure 1B:
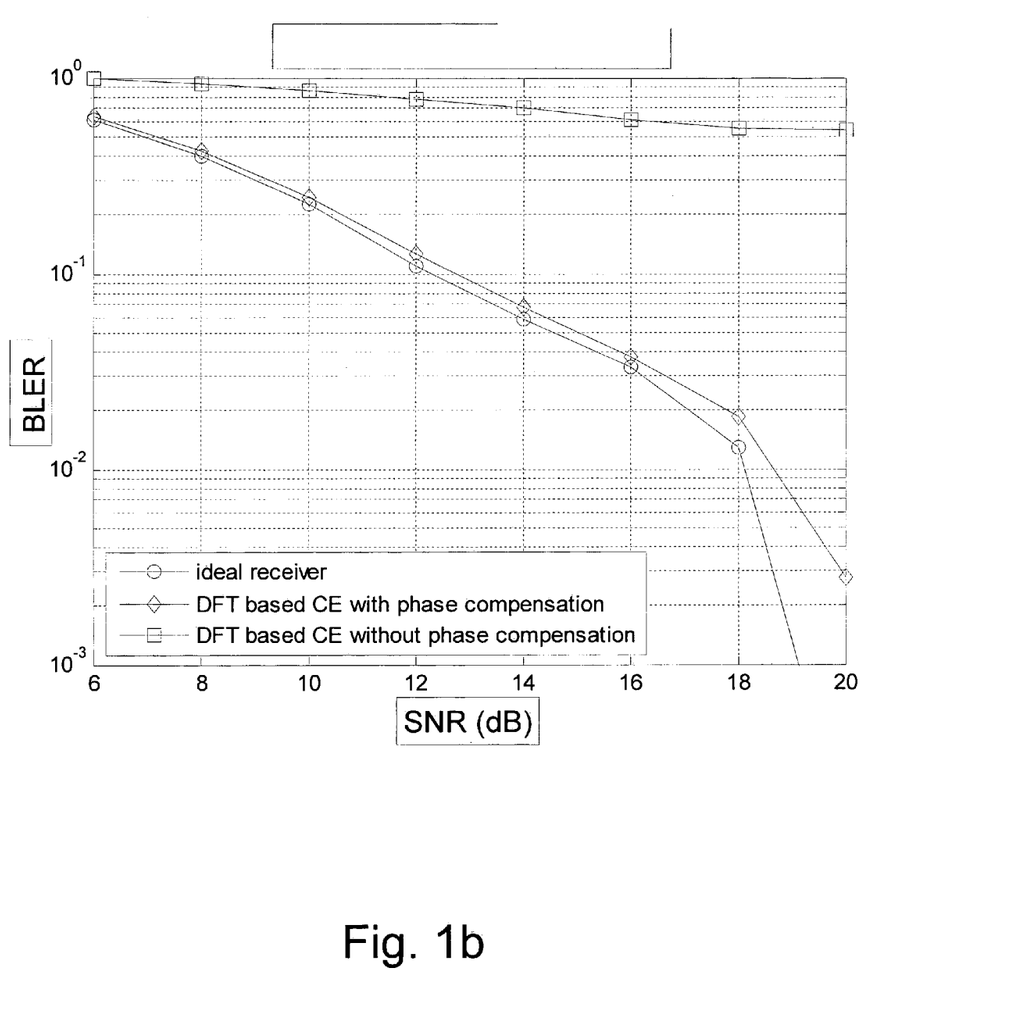
FIG. 1b illustrates a comparison of the block error rate performance for different channel estimates.

FIG. 1b shows the block error rate (BLER) performance as a function of the SNR for a channel estimate of an ideal receiver, as well as for a channel estimate with and without phase compensation. The performance of the channel estimate with phase compensation is fairly close to that of an ideal receiver. The difference is around 0.1 dB in the investigated scenario. It can also be seen that the performance of the channel estimate without phase compensation encounters a floor in BLER performance in the investigated scenario, which means that although the SNR increases, there is no decrease in the BLER.

Figure 2A:
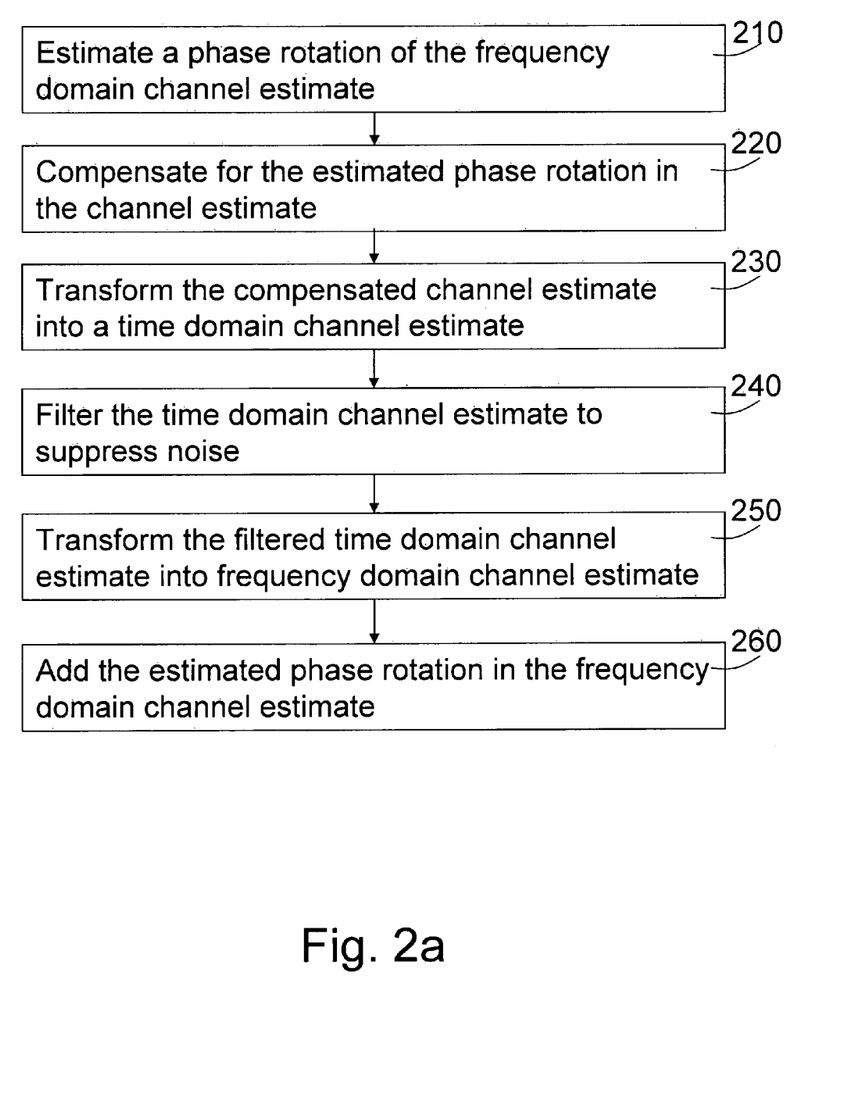
FIGS. 2a-2c are flowcharts of the method performed by the receiving node according to embodiments of the present invention.

FIG. 2a is a flowchart of the method of adjusting a frequency domain channel estimate performed by a receiving node of a wireless communication system using OFDM, according to embodiments of the present invention. It is assumed that a channel estimation scheme such as a LS channel estimation scheme provides a frequency domain channel estimate that is used as the starting point. The method comprises:

210: Estimating a phase rotation of the frequency domain channel estimate.

220: Compensating for the estimated phase rotation in the frequency domain channel estimate.

230: Transforming the compensated frequency domain channel estimate into a time domain channel estimate. In one embodiment, the compensated frequency domain channel estimate is transformed into the time domain channel estimate based on an IDFT.

240: Filtering the time domain channel estimate to suppress noise.

250: Transforming the filtered time domain channel estimate into a noise suppressed frequency domain channel estimate. According to one embodiment, the filtered time domain channel estimate is transformed into the noise suppressed frequency domain channel estimate based on a DFT.

260: Adding the estimated phase rotation in the noise suppressed frequency domain channel estimate to achieve an adjusted frequency domain channel estimate.

Figure 2B:
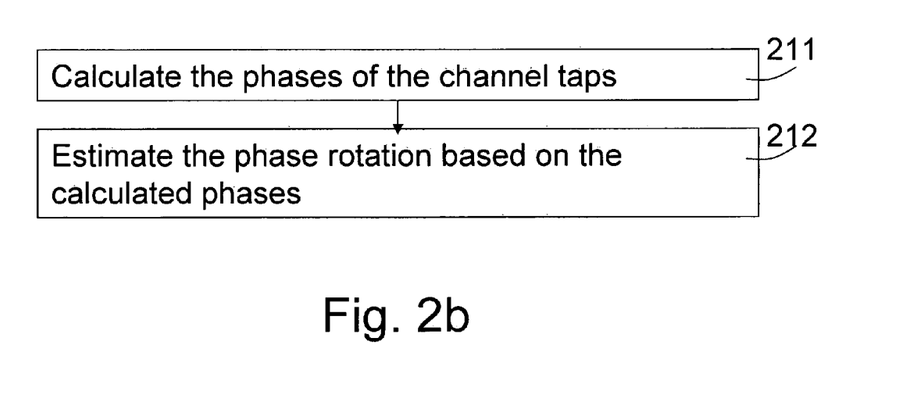

FIG. 2b is a flowchart of the method corresponding to step 210 above, according to embodiments of the present invention. Step 210 comprises the following steps:

211: Calculating the phase of each of the frequency domain channel taps. One way of calculating the phase $\theta_n$ of a frequency domain channel tap $H_n$ with index n is to use $\theta_n$=unwrap(angle($H_n$)) n=0, 1, ..., N−1, as already described above.

212: Estimating the phase rotation based on the calculated phases. According to the first embodiment described above, the calculated phases are indexed in the sequence order of the frequency domain channel taps. The indexes of the phases may be the same as the index of the corresponding channel tap. The estimation of the phase rotation comprises calculating phase differences for all pairs of calculated phases with a defined index interval, and estimating the phase rotation based on the mean value of these calculated phase differences and the defined index interval. According to the alternative second embodiment described above, the phase rotation estimation is based on a polynomial approximation using the calculated phases as input.

Figure 2C:
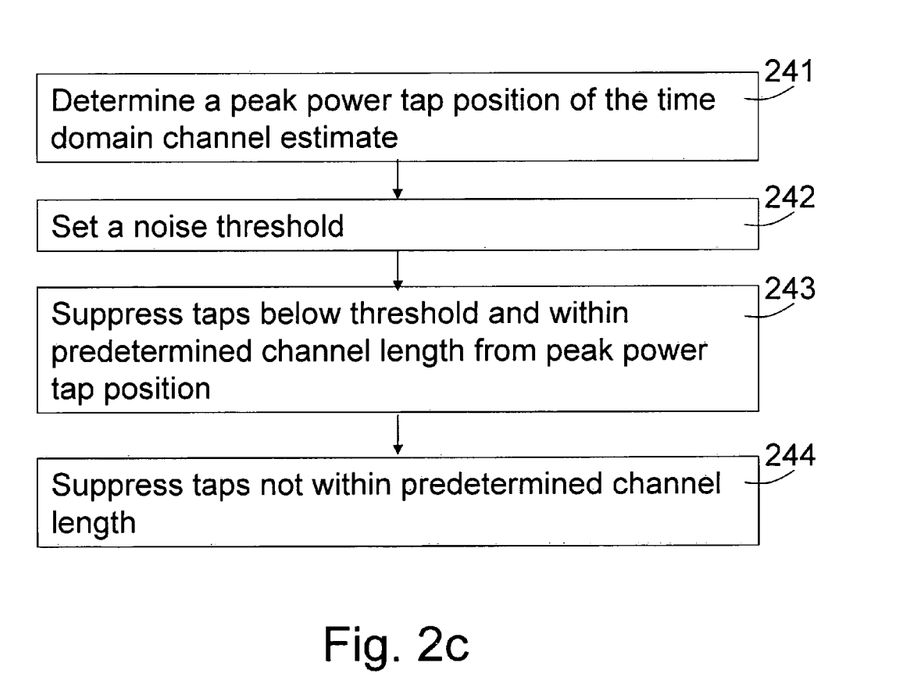

FIG. 2c is a flowchart of the method corresponding to filtering step 240 above to suppress noise in the time domain, according to embodiments of the present invention. Step 240 comprises the following steps:

241: Determining a peak power tap position of the time domain channel estimate h. The peak power of h is found at the tap with index $n_{max}$, and is given by $|h_{n_{max}}|^2$.

242: Setting a noise threshold for the time domain channel estimate. It is set as a constant times the mean noise level as described above.

243: Suppressing taps with a power that falls below the noise threshold and that are positioned within a predetermined channel length from the determined peak power tap position. The predetermined channel length L may be equal to the CP length.

244: Suppressing taps that are not positioned within the predetermined channel length from determined peak power tap position, while leaving the tap at the peak power tap position unchanged.

Figure 3A:
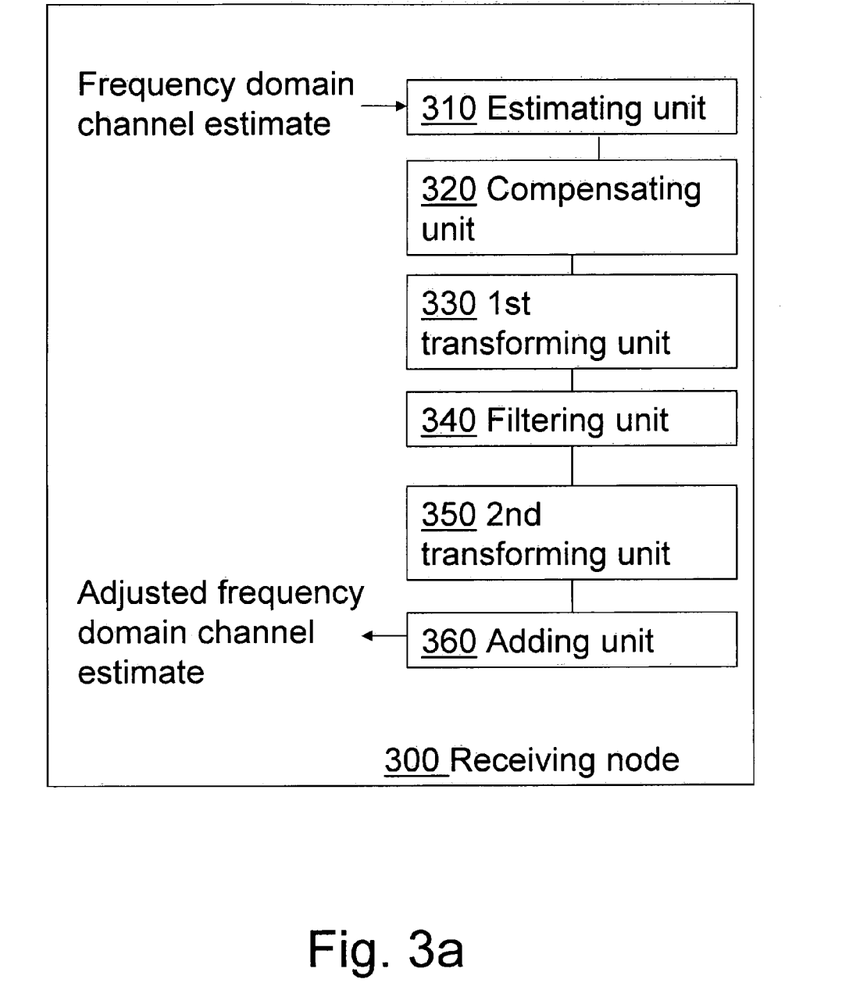
FIGS. 3a-3b illustrate schematically a receiving node according to embodiments of the present invention.

The receiving node is schematically illustrated in FIG. 3a, according to embodiments of the present invention. The receiving node 300 may in one embodiment be a radio base station in an E-UTRAN, and in another embodiment it may be a UE in an E-UTRAN. The receiving node 300 comprises an estimating unit 310 adapted to estimate a phase rotation of a frequency domain channel estimate which has e.g. been provided by a channel estimator using a LS channel estimation scheme. The frequency domain channel estimate comprises a number of frequency domain channel taps, and in one embodiment of the present invention, the estimating unit is further adapted to calculate phases of each of the frequency domain channel taps, and to estimate the phase rotation based on the calculated phases. In the first embodiment described above, the calculated phases are indexed in the sequence order of the frequency domain channel taps. The estimating unit 310 is further adapted to calculate a phase difference for each pair of the calculated phases with a defined index interval, and to estimate the phase rotation based on the mean value of the calculated phase differences and the defined index interval. In the second alternative embodiment described above, the estimating unit 310 is further adapted to estimate the phase rotation based on a polynomial approximation using the calculated phases as input.

The receiving node 300 also comprises a compensating unit 320 adapted to compensate for the estimated phase rotation in the frequency domain channel estimate, and a first transforming unit 330 adapted to transform the compensated frequency domain channel estimate into a time domain channel estimate. In one embodiment the transformation is performed based on an IDFT.

Furthermore, the receiving node 300 comprises a filtering unit 340 adapted to filter the time domain channel estimate to suppress noise. In one embodiment of the invention, the filtering unit 340 is further adapted to determine a peak power tap position of the time domain channel estimate resulting from the previous transformation, and to set a noise threshold for the time domain channel estimate. It is also adapted to suppress taps with a power that falls below the noise threshold and that are positioned within a predetermined channel length from the determined peak power tap position, as well as taps that are not positioned within the predetermined channel length from determined peak power tap position. The tap at the peak power tap position is left unchanged.

In addition to this, the receiving node 300 comprises a second transforming unit 350 adapted to transform the filtered time domain channel estimate into a noise suppressed frequency domain channel estimate. In one embodiment the transformation is performed based on a DFT. The receiving node also comprises an adding unit 360 adapted to add the previously estimated phase rotation to the noise suppressed frequency domain channel estimate in order to achieve an adjusted and improved frequency domain channel estimate.

The units described above with reference to FIG. 3a are logical units and do not necessarily correspond to separate physical units.

Figure 3B:
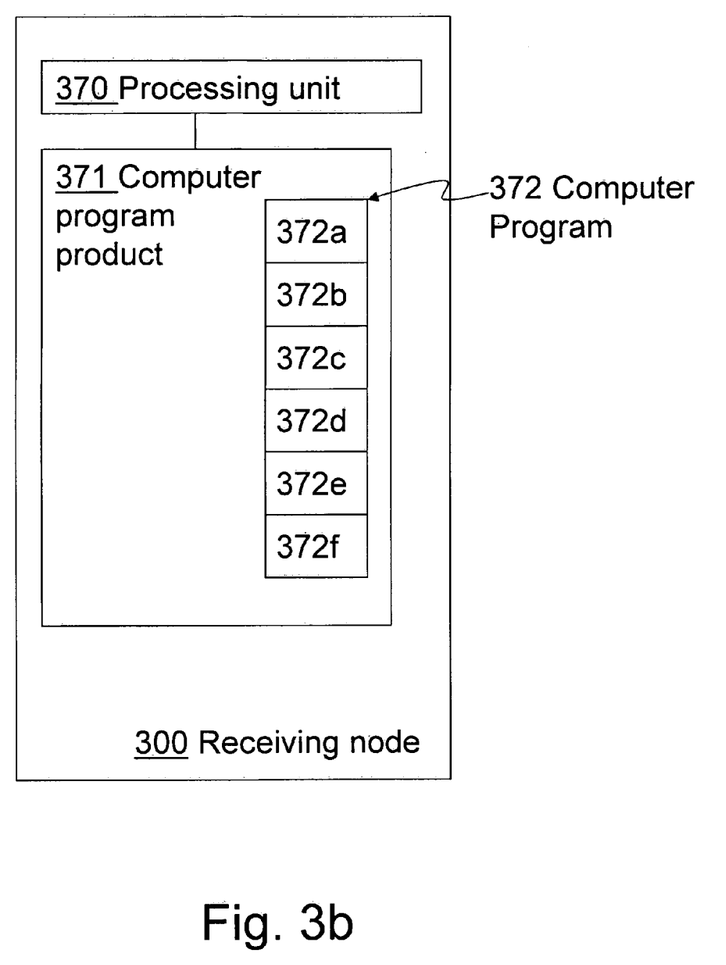

FIG. 3b schematically illustrates an embodiment of the receiving node 300, which is an alternative way of disclosing the embodiment illustrated in FIG. 3a. The receiving node 300 comprises a processing unit 370 which may be a single unit or a plurality of units. Furthermore, the receiving node 300 comprises at least one computer program product 371 in the form of a non-volatile memory, e.g. an EEPROM (Electrically Erasable Programmable Read-Only Memory), a flash memory and a disk drive. The computer program product 371 comprises a computer program 372, which comprises code means which when run on the receiving node 300 causes the processing unit 370 on the receiving node 300 to perform the steps of the procedures described earlier in conjunction with FIGS. 2a-2c.

Hence in the embodiments described, the code means in the computer program 372 of the receiving node 300 comprises an estimating module 372a for estimating a phase rotation of the frequency domain channel estimate, a compensating module 372b for compensating for the estimated phase rotation in the frequency domain channel estimate, a first transforming module 372c for transforming the compensated frequency domain channel estimate into a time domain channel estimate, a filtering module 372d for filtering the time domain channel estimate to suppress noise, a second transforming module 372e for transforming the filtered time domain channel estimate into a noise suppressed frequency domain channel estimate, and an adding module 372f for adding the estimated phase rotation to the noise suppressed frequency domain channel estimate to achieve an adjusted frequency domain channel estimate. The code means may thus be implemented as computer program code structured in computer program modules. The modules 372a-f essentially perform the steps of the flow in FIG. 2a to emulate the receiving node described in FIG. 3a. In other words, when the different modules 372a-372f are run on the processing unit 370, they correspond to the units 310-360 of FIG. 3a.

Although the code means in the embodiment disclosed above in conjunction with FIG. 3b are implemented as computer program modules which when run on the receiving node 300 causes the node to perform steps described above in the conjunction with FIGS. 2a-2c mentioned above, one or more of the code means may in alternative embodiments be implemented at least partly as hardware circuits.

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

3GPP 3rd Generation Partnership Program
BLER Block Error Rate
CN Core Network
DFT Discrete Fourier Transform
eNB Evolved Node B
EPA Extended Pedestrian A
E-UTRAN Evolved UTRAN
FFT Fast Fourier Transform
GSM Global system for Mobile communication
IDFT Inverse DFT
IFFT Inverse FFT
LMMSE Linear Minimum Mean Square Error
LS Least Square
LTE Long Term Evolution
MU-MIMO Multi-user multiple input multiple output
OFDM Orthogonal Frequency Division Multiplexing
OFDMA Orthogonal Frequency Division Multiple Access
PUSCH Physical Uplink Shared Channel
QAM Quadrature Amplitude Modulation
RAN Radio Access Network
RBS Radio Base Station
SC-FDMA Single Carrier-Frequency Division Multiple Access
SNR Signal to Noise Ratio
UE User Equipment
UMTS Universal Mobile Telecommunications System
UTRAN Universal Terrestrial RAN

The invention claimed is:

1. A method of adjusting a frequency domain channel estimate in a receiving node of a wireless communication system using Orthogonal Frequency Division Multiplexing, the method comprising:
estimating a phase rotation of the frequency domain channel estimate;
compensating for the estimated phase rotation in the frequency domain channel estimate;
transforming the compensated frequency domain channel estimate into a time domain channel estimate;
filtering the time domain channel estimate to suppress noise;
transforming the filtered time domain channel estimate into a noise suppressed frequency domain channel estimate; and
adding the estimated phase rotation to the noise suppressed frequency domain channel estimate to achieve an adjusted frequency domain channel estimate.

2. The method according to claim 1, wherein the frequency domain channel estimate comprises a number of frequency domain channel taps, and wherein estimating the phase rotation comprises calculating a phase of each of said frequency domain channel taps, and estimating the phase rotation based on said calculated phases.

3. The method according to claim 2, wherein said calculated phases are indexed in a sequence order of said frequency domain channel taps, and wherein estimating the phase rotation comprises calculating a phase difference for each pair of said calculated phases with a defined index interval, and estimating the phase rotation based on a mean value of said calculated phase differences and the defined index interval.

4. The method according to claim 2, wherein estimating the phase rotation is based on a polynomial approximation using said calculated phases as input.

5. The method according to claim 1, wherein the compensated frequency domain channel estimate is transformed into the time domain channel estimate based on an inverse discrete Fourier transform.

6. The method according to claim 1, wherein filtering the time domain channel estimate comprises:
determining a peak power tap position of the time domain channel estimate;
setting a noise threshold for the time domain channel estimate;
suppressing taps with a power that falls below the noise threshold and that are positioned within a predetermined channel length from the determined peak power tap position; and
suppressing taps that are not positioned within the predetermined channel length from the determined peak power tap position, while leaving the tap at the peak power tap position unchanged.

7. The method according to claim 1, wherein the filtered time domain channel estimate is transformed into the noise suppressed frequency domain channel estimate based on a discrete Fourier transform.

8. A receiving node for a wireless communication system using Orthogonal Frequency Division Multiplexing, the receiving node configured to adjust a frequency domain channel estimate and comprising a processing circuit configured to:
estimate a phase rotation of the frequency domain channel estimate;
compensate for the estimated phase rotation in the frequency domain channel estimate;
transform the compensated frequency domain channel estimate into a time domain channel estimate;
filter the time domain channel estimate to suppress noise;
transform the filtered time domain channel estimate into a noise suppressed frequency domain channel estimate; and
add the estimated phase rotation to the noise suppressed frequency domain channel estimate to achieve an adjusted frequency domain channel estimate.

9. The receiving node according to claim 8, wherein the frequency domain channel estimate comprises a number of frequency domain channel taps, and wherein the processing circuit is configured to calculate phases of each of said frequency domain channel taps, and to estimate the phase rotation based on said calculated phases.

10. The receiving node according to claim 9, wherein said calculated phases are indexed in a sequence order of said frequency domain channel taps, and the processing circuit is configured to calculate a phase difference for each pair of said calculated phases with a defined index interval, and to estimate the phase rotation based on a mean value of said calculated phase differences and the defined index interval.

11. The receiving node according to claim 9, wherein the processing circuit is configured to estimate the phase rotation based on a polynomial approximation using said calculated phases as input.

12. The receiving node according to claim 8, wherein the processing circuit is configured to transform the compensated frequency domain channel estimate into a time domain channel estimate based on an inverse discrete Fourier transform.

13. The receiving node according to claim 8, wherein the processing circuit is configured to determine a peak power tap position of the time domain channel estimate, set a noise threshold for the time domain channel estimate, suppress taps with a power that falls below the noise threshold and that are positioned within a predetermined channel length from the determined peak power tap position, and suppress taps that are not positioned within the predetermined channel length from determined peak power tap position, while leaving the tap at the peak power tap position unchanged.

14. The receiving node according to claim 8, wherein the processing circuit is configured to transform the filtered time domain channel estimate into the noise suppressed frequency domain channel estimate based on a discrete Fourier transform.

15. The receiving node according to claim 8, wherein the receiving node is a radio base station or a user equipment in an E-UTRAN.

\* \* \* \* \*

UNITED STATES PATENT AND TRADEMARK OFFICE
CERTIFICATE OF CORRECTION

PATENT NO. : 9,001,935 B2
APPLICATION NO. : 13/880900
DATED : April 7, 2015
INVENTOR(S) : Guo et al.

Page 1 of 1

It is certified that error appears in the above-identified patent and that said Letters Patent is hereby corrected as shown below:

In the specification

In Column 6, Line 4, delete "$H_{N-2}, H_{N-1}$" and insert -- $\hat{H}_{N-2}, \hat{H}_{N-1}$ --, therefor.

Signed and Sealed this
First Day of December, 2015

Michelle K. Lee
*Director of the United States Patent and Trademark Office*